UNITED STATES PATENT OFFICE.

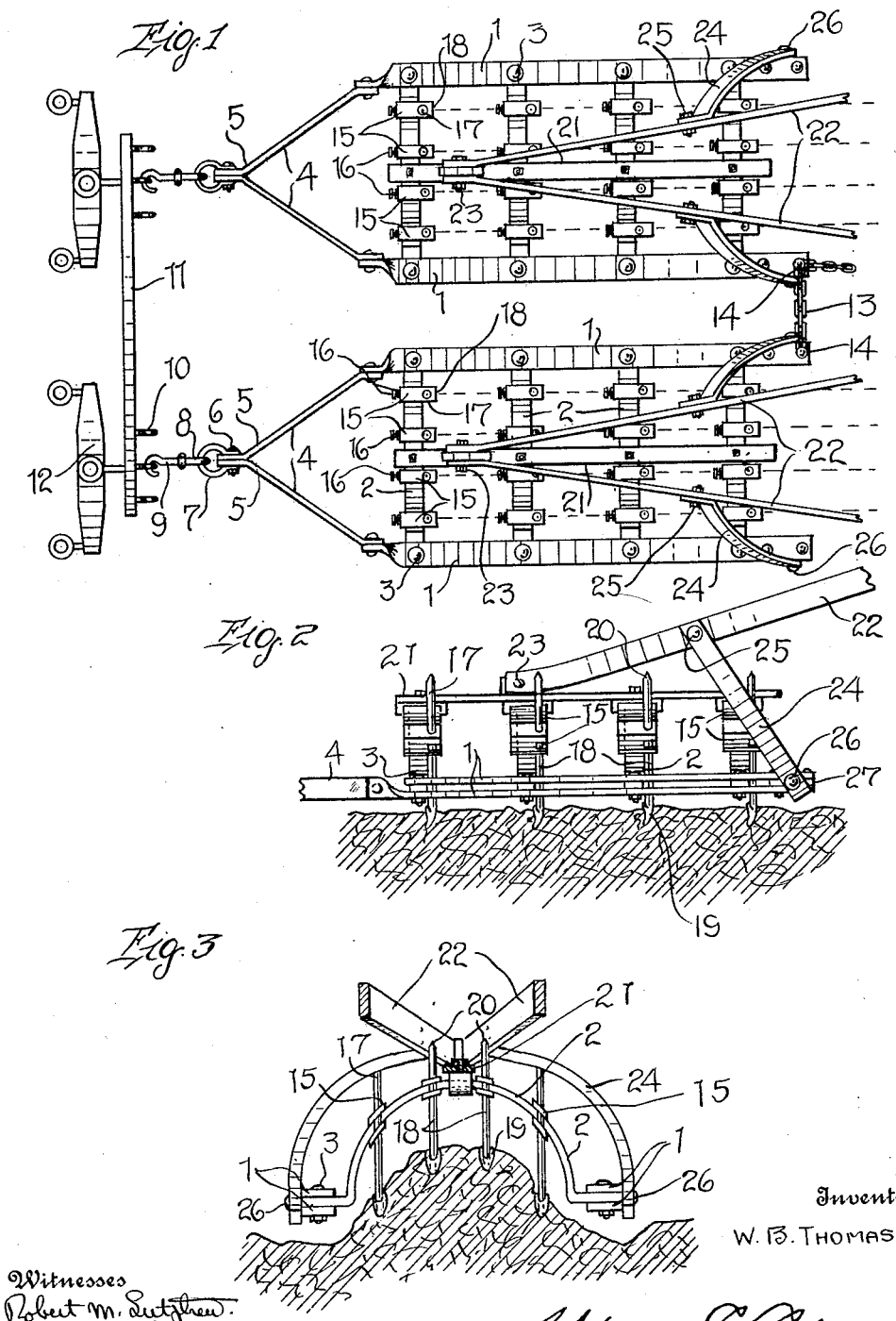

WILLIAM B. THOMAS, OF CALEDONIA, MISSISSIPPI.

AGRICULTURAL IMPLEMENT.

1,113,382.     Specification of Letters Patent.     Patented Oct. 13, 1914.

Application filed September 22, 1913. Serial No. 791,186.

*To all whom it may concern:*

Be it known that I, WILLIAM B. THOMAS, a citizen of the United States, residing at Caledonia, in the county of Lowndes and State of Mississippi, have invented certain new and useful Improvements in Agricultural Implements, of which the following is a specification, reference being had to the accompanying drawings.

This invention comprehends certain new and useful improvements in agricultural implements and relates more specifically to harrows.

An object of the invention is to provide an improved and simplified construction of harrow which may be readily reversed to bring into operation a different form of tooth or implement.

A further object is to provide an improved and novel form of reversible harrow with standards carried by the curved tooth carrying bars and having different forms of teeth upon their opposite ends.

A still further object is to provide an improved reversible harrow of this character which may be especially adapted for cultivating ground prepared for receiving cotton seed.

A still further object is to generally improve and simplify the construction and operation of devices of this character and increase the efficiency thereof without increasing the cost of the same.

With the above and other objects in view, my invention consists in certain novel constructions, combinations, and arrangements of parts to be hereinafter more fully described, claimed, and illustrated in the accompanying drawings, in which, Figure 1 is a top plan view of my complete device; Fig. 2 is a side elevational view with parts broken away; and Fig. 3 is a rear elevational view with the handles shown in section.

Referring more specifically to the drawings in which similar reference characters designate corresponding parts throughout the several views, 1 designates the longitudinal frame members which are arranged in pairs to form the opposite sides of the frame members of the device, said pairs of longitudinal members being spaced apart by the curved or semi-circular tooth carrying bars 2, which have their opposite ends directed outwardly and secured between the longitudinal members 1 of each pair, by means of the bolts 3, which bolts 3 also serve to connect the longitudinal frame members 1 of each pair and retain the same in proper spaced relation. The tooth carrying bars 2 extend transversely of the implement and are curved upwardly as will be clearly understood by referring to Fig. 3. The longitudinal frame members 1 have the inner ends of the strap members 4 secured therebetween, said strap members extending forwardly and toward one another and having their forward ends turned, as shown at 5, and secured together by the pivot bolt 6 upon which are mounted the opposite outwardly directed ends of the ring 7, within which the ring 8 is secured having the hook 9 swiveled thereto, said hook being adapted for engagement in one of the loops 10 secured on the rear face of the doubletree 11, near the opposite ends thereof, the swingletrees 12 being connected in any suitable manner to the outer face of the doubletree 11, adjacent the opposite ends thereof. It will be understood that two frames are employed and that said frames are of similar construction and connected in the same manner to the doubletree 11.

The frames are connected at their rear ends by the chain 13, secured upon the bolts 14 carried by the inner pairs of longitudinal frame members 1 of said frames. It will be readily seen that by employing the chain 13 to connect the rear ends of the frames, the distance between said rear ends of the frames may be readily regulated by securing the proper links of the chain over the bolts 14.

The tooth carrying bars 2 have the bracket members 15 mounted thereon, said bracket members being in the form of transversely split rings engaged around the curved portions of said tooth carrying bars 2 and adapted to be adjusted upon said bars 2 and secured in adjusted position by the set screws 16 threaded in the central portions of said bracket members 15 and having their ends engaged against one face of the bars 2. The vertical toothed standards 17 are secured through the spaced outwardly directed ends 18 of the bracket members 15 and have the teeth 19 and 20 formed upon their opposite ends. The teeth 19 and 20, it will be understood, are of different form and intended for different purposes, whereby the frames are in one position when the machine is being employed for one character of work and are turned over or inverted when the implement is being employed for a different character of work.

The curved portions of the bars 2 are connected by the central longitudinal beam 21 which is provided with suitable openings through which the bars 2 are engaged. The handles 22 are connected at their forward ends to opposite faces of the central longitudinal beam 21 by the bolt 23 or other suitable means and the handles 22 are braced by means of the curved brace bars 24 which have their upper or forward ends pivoted to the handles 22, as shown at 25, while the lower or rear ends of the brace bars 21 are pivoted, as shown at 26, to the spacing blocks 27 between the rear ends of the longitudinal frame members 1, said blocks 27 serving to space apart the upper and lower longitudinal frame members of each pair 1, at the rear ends of said members.

It will be understood that when the frames are to be inverted, the handles 22 are removed from the bolt 23 and disconnected from the forward ends of the curved brace bars 24 and reversed, after which they are again secured upon the bolts 23 and 25, it being understood that the curved brace bars 24 are swung around the ends of the frames. By reversing the handles and the curved brace bars 24 in this manner, it will be seen that said handles and curved brace bars will be out of the way of the teeth, thereby allowing the same to properly engage the surface to be worked.

From the foregoing it will be seen that I have provided an improved reversible harrow of extremely simple construction and operation and which may be readily reversed or turned over to bring the teeth or implements on either end of the standards 18 into position for engagement with the surface to be worked.

While I have shown two frames connected to a doubletree, it will be understood that, if desired, a single frame may be employed and a swingletree connected in any suitable manner to the forward end thereof. It will also be understood that while I have shown the preferred construction and arrangements of parts employed in my invention, various changes may be made within the scope of the appended claims without departing from the spirit of my invention or sacrificing any of the advantages of the same.

What I claim is:—

1. A device of the class described comprising a frame, tooth carrying bars mounted in the frame and having curved portions, toothed standards mounted on the curved portions of the tooth carrying bars and having teeth formed on their opposite ends, a longitudinal beam secured on said tooth carrying bars, and handles carried by the longitudinal beam.

2. A device of the class described comprising a supporting frame, tooth carrying bars mounted in said frame, bracket members adjustably mounted on the tooth carrying bars, standards mounted in said bracket members and having teeth formed on their opposite ends, a longitudinal beam, said tooth carrying bars being engaged through the longitudinal beam, handles connected with the longitudinal beam, brace members secured to the handles and to the supporting frame, and draft means secured to one end of the frame.

3. A device of the class described comprising a frame including longitudinal members, means for connecting the forward ends of the longitudinal members, bowed tooth carrying bars extended between the longitudinal frame members and having their opposite ends secured to the latter, bracket members mounted on said bowed tooth carrying bars, standards mounted in said bracket members and having teeth formed upon their ends, a longitudinal beam mounted upon said bowed tooth carrying bars, and draft means secured to one end of the frame.

4. A device of the class described comprising connected longitudinal frame members, curved tooth carrying bars, means for securing the ends of the curved tooth carrying bars to the longitudinal frame members, bracket members mounted on the tooth carrying bars, standards secured in said brackets and having teeth formed upon their opposite ends, a longitudinal beam, said curved tooth carrying bars being secured through the longitudinal beam, and handles carried by said beam.

5. A device of the class described comprising reversible frame members, curved tooth carrying bars having their ends directed outwardly, means for securing the outwardly directed ends in the frame members, said frame members being connected at their forward ends, standards mounted on the tooth carrying bars and having teeth formed upon their opposite ends, and reversible handles for the device.

6. A device of the class described comprising a pair of frames, means for connecting the rear ends of the frames, a connecting bar for the forward ends of the frames, means for rotatably connecting the forward ends of the frame members to one face of the connecting bar, tooth carrying bars mounted transversely in the frames, bracket members carried by the tooth carrying bars, standards carried by the brackets and having teeth formed upon their opposite ends, means for securing the brackets in position upon the tooth carrying bars, and handles for the device.

In testimony whereof I hereunto affix my signature in the presence of two witnesses.

WILLIAM B. THOMAS.

Witnesses:
J. H. Cook,
J. C. Morehead.